US010246159B2

(12) United States Patent
Harada et al.

(10) Patent No.: US 10,246,159 B2
(45) Date of Patent: Apr. 2, 2019

(54) FRONT STRUCTURE OF SADDLE-RIDE TYPE VEHICLE

(71) Applicant: HONDA MOTOR CO., LTD., Tokyo (JP)

(72) Inventors: Dai Harada, Wako (JP); Hiroaki Tsukui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 327 days.

(21) Appl. No.: 14/510,998

(22) Filed: Oct. 9, 2014

(65) Prior Publication Data

US 2015/0101441 A1 Apr. 16, 2015

(30) Foreign Application Priority Data

Oct. 11, 2013 (JP) .................................. 2013-214149
Aug. 21, 2014 (JP) .................................. 2014-168687

(51) Int. Cl.
| | |
|---|---|
| *B62K 21/12* | (2006.01) |
| *B62J 29/00* | (2006.01) |
| *B62K 23/06* | (2006.01) |
| *B62L 3/02* | (2006.01) |
| *B62J 23/00* | (2006.01) |

(52) U.S. Cl.
CPC ............... *B62K 21/12* (2013.01); *B62J 23/00* (2013.01); *B62J 29/00* (2013.01); *B62K 23/06* (2013.01); *B62L 3/02* (2013.01); *Y10T 74/20287* (2015.01)

(58) Field of Classification Search
CPC ...... B62K 21/125; B62K 21/12; B62K 21/26; B62K 11/14; B62J 23/00; B62J 29/00; B62J 17/04; B62J 17/02; B62J 17/00; B60R 1/006; Y10T 74/20822; Y10T 74/2078; Y10T 74/20828
See application file for complete search history.

(56) References Cited

U.S. PATENT DOCUMENTS

| | | | |
|---|---|---|---|
| 9,016,167 B2 * | 4/2015 | Degarate ................. | B62J 23/00 280/288.4 |
| 2003/0177857 A1 * | 9/2003 | Chuang ................... | B62J 29/00 74/551.8 |
| 2004/0129107 A1 * | 7/2004 | Wu ......................... | B62K 21/26 74/551.9 |
| 2004/0217243 A1 * | 11/2004 | Laivins ................... | B62J 23/00 248/230.1 |
| 2005/0040621 A1 * | 2/2005 | Paris ....................... | B62K 11/14 280/279 |

(Continued)

FOREIGN PATENT DOCUMENTS

| | | | | |
|---|---|---|---|---|
| EP | 1464570 A1 * | 10/2004 | ............. | B62J 29/00 |
| FR | 580453 A * | 11/1924 | ............. | B62K 21/26 |

(Continued)

*Primary Examiner* — Daniel D Yabut
(74) *Attorney, Agent, or Firm* — Birch, Stewart, Kolasch & Birch, LLP

(57) ABSTRACT

In a motorcycle including grips provided at lateral ends of a steering handlebar to be grasped by an occupant, and a brake lever and a clutch lever provided forward of the steering handlebar, lever guards are provided at the lateral ends of the steering handlebar and extend forward to protect the brake lever and the clutch lever. Mirror bodies are attached to front portions of the lever guards.

16 Claims, 17 Drawing Sheets

(56) References Cited

U.S. PATENT DOCUMENTS

| | | | |
|---|---|---|---|
| 2007/0039408 A1* | 2/2007 | Laivins | B62J 23/00 74/551.8 |
| 2007/0062326 A1* | 3/2007 | Laivins | B62J 27/00 74/551.8 |
| 2008/0141821 A1 | 6/2008 | Degarate et al. | |
| 2008/0264198 A1* | 10/2008 | Laivins | B62J 23/00 74/551.8 |
| 2009/0235527 A1* | 9/2009 | Degarate | B21D 22/02 29/897.2 |
| 2012/0234129 A1* | 9/2012 | Adan | B62J 23/00 74/551.8 |
| 2012/0234130 A1* | 9/2012 | Yu | B62K 21/26 74/551.9 |
| 2012/0279348 A1* | 11/2012 | Wood | B62J 23/00 74/551.8 |

FOREIGN PATENT DOCUMENTS

| | | | | |
|---|---|---|---|---|
| FR | 583799 A | * | 1/1925 | ............ B62K 21/26 |
| GB | 735168 A | * | 8/1955 | ............ B62J 29/00 |
| GB | 793327 A | * | 4/1958 | ............ B62J 29/00 |
| GB | 822393 A | * | 10/1959 | ............ B60R 1/06 |
| GB | 877760 A | * | 9/1961 | ............ B62J 29/00 |
| GB | 888178 A | * | 1/1962 | ............ B62J 29/00 |
| JP | 08-216954 A | | 8/1996 | |

* cited by examiner

FRONT STRUCTURE OF SADDLE-RIDE TYPE VEHICLE

CROSS-REFERENCE TO RELATED APPLICATIONS

The present application claims priority under 35 USC 119 to Japanese Patent Application No. 2013-214149 filed Oct. 11, 2013 and Japanese Patent Application No. 2014-168687 filed Aug. 21, 2014 the entire contents of which are hereby incorporated by reference.

BACKGROUND OF THE INVENTION

1. Field of the Invention

The present invention relates to an improvement in saddle-ride type vehicles equipped with rearview mirrors in the forward part of the vehicle.

2. Description of Background Art

Typically, saddle-ride type vehicles are equipped with rearview mirrors in the forward part of the vehicles. Various types of structures of mounting the mirror have been suggested. See, for example, JP-A No. H8-216954 (FIG. 1).

As illustrated in FIG. 1 of JP-A No. H8-216954, a mirror (15) (the reference numerals in parentheses indicate the signs referred to in JP-A No. H8-216954, the same shall apply hereinafter) has a stay (13), a shaft (5) is fixed to the stay (13). The mirror (15) is mounted by inserting the shaft (5) into a steering handlebar (7).

On the other hand, the steering handlebar (7) of the saddle-ride type vehicle is provided with a brake lever and/or clutch lever and a lever guard providing for protection for these levers may be mounted.

In the techniques according to JP-A No. H8-216954, the steering handlebar (7) is not provided with a lever guard that protects the lever. A vehicle driving on a public roadway is required to mount a rearview mirror on the steering handlebar, but both of the mirror and the lever guard are not easily mounted on the steering handlebar. A technique for facilitating the mounting of the lever guard and the mirror on the steering handlebar is desired.

SUMMARY AND OBJECTS OF THE INVENTION

An object of an embodiment of the present invention is to provide a front structure of a saddle-ride type vehicle which enables easy mounting of a lever guard and a mirror on a steering handlebar.

According to an embodiment of the present invention, the front structure of a saddle-ride type vehicle includes a grip provided at a lateral end of a steering handlebar to be grasped by an occupant. At least one of a brake lever and a clutch lever is provided forward of the steering handlebar. A lever guard is provided at the lateral end of the steering handlebar and extends forward to protect the brake lever or the clutch lever. A lower end of a mirror stay that extends vertically is attached to a front portion of the lever guard with a mirror body being attached to an upper end of the mirror stay.

According to an embodiment of the present invention, the lateral end of the steering handlebar and the lever guard are fastened in a first connection with the lever guard and the mirror stay being fastened in a second connection and the upper end of the mirror stay and the mirror body are rotatably fastened in a third connection. As viewed in a side view of the vehicle, the second connection is placed forward of either a front end of the brake lever or a front end of the clutch lever.

According to an embodiment of the present invention, the first connection is fastened to the lateral end of the steering handlebar with a first fastening member for insertion of a rear end portion of the lever guard from outside toward inside in a vehicle-width direction.

According to an embodiment of the present invention, the first connection has a collar having a slit inserted into the steering handlebar with a nut of a tapered shape engaged with the collar. When the first fastening member is tightened to the nut, the slit is opened up by a tractive force produced by the first fastening member to be pressed against an inner wall of the steering handlebar, so that the first connection is positioned in the steering handlebar.

According to an embodiment of the present invention, a recess is provided on one of the lateral end of the steering handlebar and the collar, while a protrusion is provided on the other of the lateral end of the steering handlebar and the collar. The recess and the protrusion are engaged with each other to block rotation of the lever guard relative to the steering handlebar.

According to an embodiment of the present invention, the second connection is fastened by a second fastening member inserted rearwardly from the front in a forward and rearward direction, with the lower end of the mirror stay being placed to a front end portion of the lever guard.

According to an embodiment of the present invention, the second connection is fastened by a second fastening member inserted upward from below, with the lower end of the mirror stay that is placed to a front end portion of the lever guard.

According to an embodiment of the present invention, the second connection is fastened by the second fastening member, with two washers that are placed on each of upward and downward sides of the mirror stay.

According to an embodiment of the present invention, the third connection is fastened from above to below by a third fastening member with a lower end of the mirror body that is inserted into the upper end of the mirror stay. The mirror body is rotatably supported by the mirror stay.

According to an embodiment of the present invention, as viewed in a side view of the vehicle, the lever guard and the mirror stay have a downward protruding arc shape.

According to an embodiment of the present invention, the lever guard is attached to the lateral end of the steering handlebar. The lower end of the mirror stay extending vertically is attached to a front portion of the lever guard. In turn, the mirror body is attached to the upper end of the mirror stay. More specifically, the lever guard is mounted to the steering handlebar, and the mirror body is mounted to the lever guard through the mirror stay.

With such a construction, easy mounting of the lever guard and the mirror to the handlebar is made possible. Even in a vehicle equipped with a lever guard, the mirror body can be arranged in an optimum position forward of an occupant.

According to an embodiment of the present invention, the steering handlebar and the lever guard are fastened with the first connection, then the lever guard and the mirror stay are fastened with the second connection, and the mirror stay and the mirror body are fastened with the third connection. In this manner, the three members are individually fastened to the connection by the fastening members. As a result, the degree of freedom of positional adjustment to the mirror is increased to facilitate orienting the mirror in an arbitrary direction.

According to an embodiment of the present invention, the lever guard is fastened by the first fastening member inserted inward from outside in the vehicle-width direction. Working with the mounting can be improved in view of the fact that the first fastening member is inserted inward from outside for fastening.

According to an embodiment of the present invention, the first connection has the collar and the nut abutting on the collar. The first connection is mounted to the steering handlebar with a simple structure including the nut of a tapered shape, the collar with the slit and the first fastening member. In addition, adjustment in the axis direction facilitates positioning of the first connection.

According to an embodiment of the present invention, one and the other of the lateral end of the steering handlebar and the collar are provided with the recess and the protrusion for detent. This makes it possible to prevent rotation of the lever guard with the unsophisticated structure. In addition, the simple recess and protrusion facilitates addressing dimensional errors occurring in manufacturing.

According to an embodiment of the present invention, the second connection is fastened by the second fastening members inserted rearwardly from the front in the forward and rearward direction. Because the second fastening member is inserted rearwardly from the front, when viewed from above or from the obliquely upward direction, the external appearances around the lever guard and the mirror body are not easily impaired.

According to an embodiment of the present invention, the second connection is fastened by the second fastening member inserted upward from below. Because the second fastening member is inserted from below in the upward direction, it is unlikely that the external appearances around the lever guard and the mirror stay would be impaired when viewed from above.

According to an embodiment of the present invention, the second connection is fastened by the second fastening member with the two washers that are placed on each of the upward and downward sides of the mirror stay. The interposition of the washers two of which are placed on each side causes an application of an appropriate friction when the mirror stay is rotated. As a result, the rotating movement of the minor stay can be smoothly and readily adjusted.

According to an embodiment of the present invention, the third connection is fastened from above in the downward direction. In this case, the nut is hidden behind the mirror. In view of this connection, there is no concern for a loss of external appearances around the mirror stay.

According to an embodiment of the present invention, the lever guard and the mirror stay are designed to have a downward protruding arc shape. Because the lever guard and the mirror stay are downward curved, an area around the lever is clear, making it difficult for the occupant's hand to touch the lever guard during operation of the lever.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
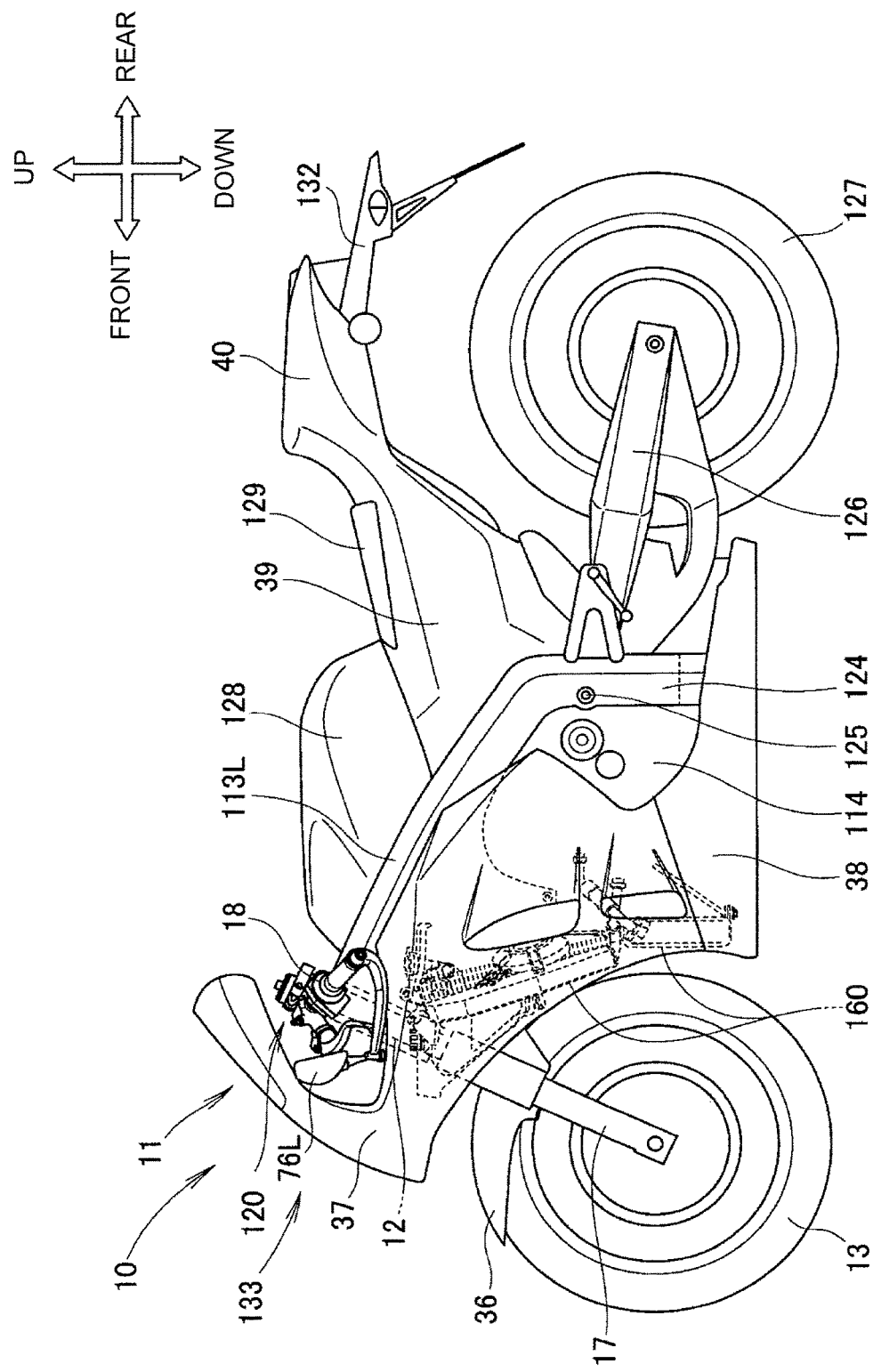
FIG. 1 is a left side view of a motorcycle according to the present invention.

Embodiments of the present invention will be described in detail below. In the drawings and embodiments, "up," "down," "front," "rear," "left" and "right" refer to the respective directions as viewed by a rider riding on the motorcycle.

A first embodiment according to the present invention will be described with reference to the drawings.

As illustrated in FIG. 1, a saddle-ride type vehicle, motorcycle 10, includes a body frame 11. The body frame 11 includes a head pipe 12 and a pair of left and right main frames 113L, 113R (FIG. 1 showing only reference sign 113L on the front side of the sheet of the drawing) extending from the head pipe 12 to the rearward direction of the vehicle. An engine 114 is suspended under the pair of left and right main frames 113L, 113R. A heat exchanger 160 is placed forward of the engine 114 to use a flow of air to cool as a cooling medium.

A front-wheel steering section 120 is mounted to the head pipe 12. The front-wheel steering section 120 includes, as main elements, a front fork 17, a steering handlebar 18 mounted to the top end of the front fork 17, and a front wheel 13 mounted to the lower end of the front fork 17.

A pivot 124 is included in rear portions of the main frames 113L, 113R. A pivot shaft 125 extends horizontally through the pivot 124 in the vehicle-width direction. A swing arm 126 extends from the pivot shaft 125 in the rearward direction of the vehicle. In turn, a rear wheel 127 is rotatably mounted at the rear end of the swing arm 126.

In a position rearward of the steering handlebar 18, a fuel tank 128 is mounted to the main frames 113L, 113R. A seat 129 on which an occupant sits is provided immediately behind the fuel tank 128. A front fender 36 is attached to the front fork 17 to stop mud thrown up by the front wheel 13, while a rear fender 132 is attached to the rearward part of the vehicle to stop mud thrown up by the rear wheel 127. The body frame 11 and the engine 114 are covered with the body cover 133.

The body cover 133 is made up of a front cowl 37 covering a forward part of the vehicle, an under cowl 38 located contiguous to a lower portion of the front cowl 37 to cover a lower part of the vehicle, a middle cowl 39 covering the lateral sides of the seat 129, and a rear cowl 40 located contiguous to the middle cowl 39 to cover lateral sides of a rear part of the vehicle.

Figure 2:
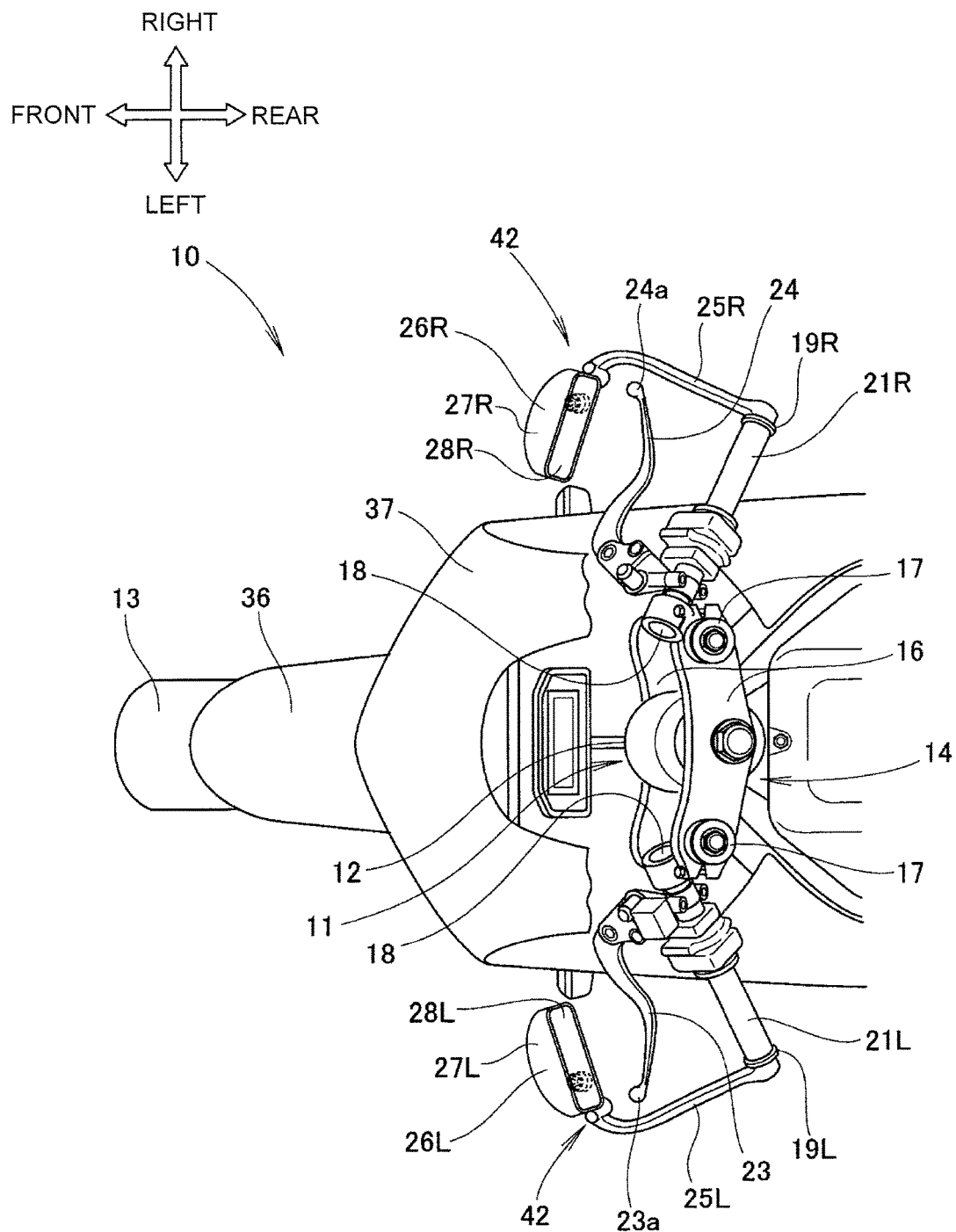
FIG. 2 is a plan view of a motorcycle according to the present invention.

As illustrated in FIG. 2, in a front portion of the saddle-ride type vehicle (motorcycle 10), a front-wheel steering unit 14 is turnably provided on the head pipe 12 of the body frame 11 for steering the front wheel 13.

The front-wheel steering unit 14 includes a steering shaft 15 (see FIG. 2) supported turnably by the head pipe 12, bridge members 16 provided integrally with the steering shaft 15, the front fork 17 supported by the bridge members 16 to hold the front wheel 13, and the steering handlebar 18 attached to the front fork 17.

Left and right grips 21L, 21R grasped by the occupant are provided at the lateral ends 19 of the steering handlebar 18. A clutch lever 23 is provided forward of the left lateral end 19L of the steering handlebar 18, while a brake lever 24 is provided forward of the right lateral end 19R of the steering handlebar 18.

A left lever guard 25L is mounted at the left lateral end 19L of the steering handlebar 18 and extends forward to protect the clutch lever 23, while a right lever guard 25R is mounted at the right lateral end 19R of the steering handlebar 18 and extends forward to protect the brake lever 24.

Left and right mirror bodies 26L, 26R are mounted respectively at the front ends of the left and right lever guards 25L, 25R. The left and right mirror bodies 26L, 26R include, respectively, mirror holders 27L, 27R and mirrors 28L, 28R fitted in the mirror holders 27L, 27R. The front fender 36 covers above the front wheel 13, while the front cowl 37 covers the front of the forward part of the vehicle.

In the embodiment, the left and right lever guards are provided respectively at the left and right lateral ends of the steering handlebar. However, some vehicles may be equipped with either a brake lever or a clutch lever. In such cases it's perfectly all right to provide the lever guard only on the lever mounting side.

The following description in FIG. 3 to FIG. 10 is of the left lever guard 25L and the left mirror body 26L mounted to the left of the steering handlebar. However, the explanation of the structure of the right lever guard and the right mirror body mounted to the right of the steering handlebar is omitted because of the structure with bilateral symmetry about the center line in the vehicle-width direction. Also, suffixes (L, R) designating left and right are omitted. The mirrors 28L, 28R which are reflecting plates are omitted for the sake of clarity on the support structure of the mirror body 26.

Figure 3:
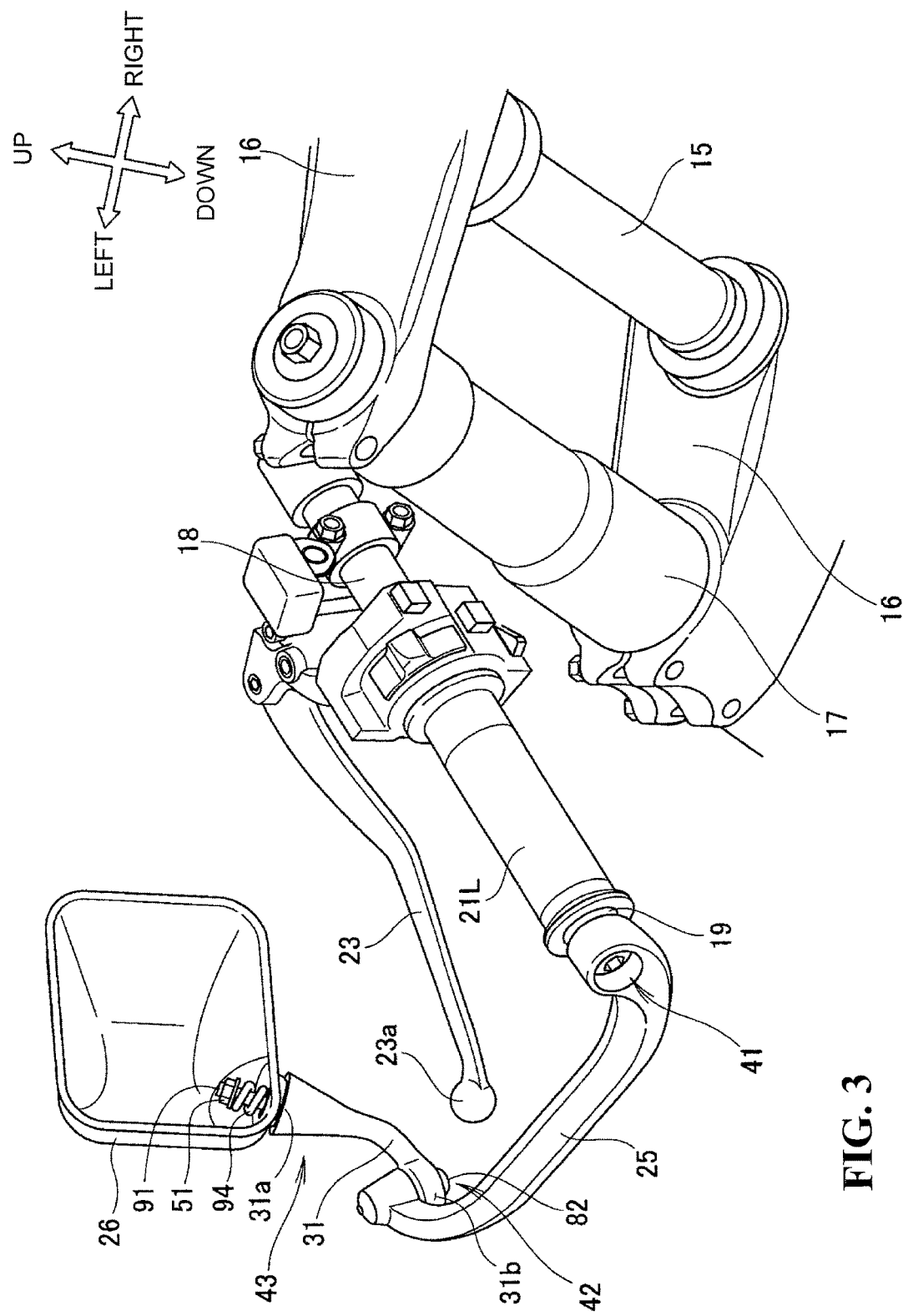
FIG. 3 is a perspective view showing an essential part of FIG. 1 to illustrate a lever guard.

As illustrated in FIG. 3, the lever guard 25 extending forward is attached to the lateral end 19 of the steering handlebar 18. A mirror stay 31 extending upwardly is attached to a front portion of the lever guard 25. In turn, the mirror body 26 is attached to the mirror stay 31. More specifically, the lower end 31b of the mirror stay 31 is attached to the lever guard 25, and then the mirror body 26 is attached to the upper end 31a of the mirror stay 31.

The lateral end 19 of the steering handlebar 18 and the lever guard 25 are fastened together in a first connection 41. The lever guard 25 and the mirror stay 31 are fastened together in a second connection 42. The upper end 31a of the mirror stay 31 and the mirror body 26 are turnably fastened in a third connection 43.

The structure of the first connection is described with reference to FIG. 4 to FIG. 6.

Figure 4:
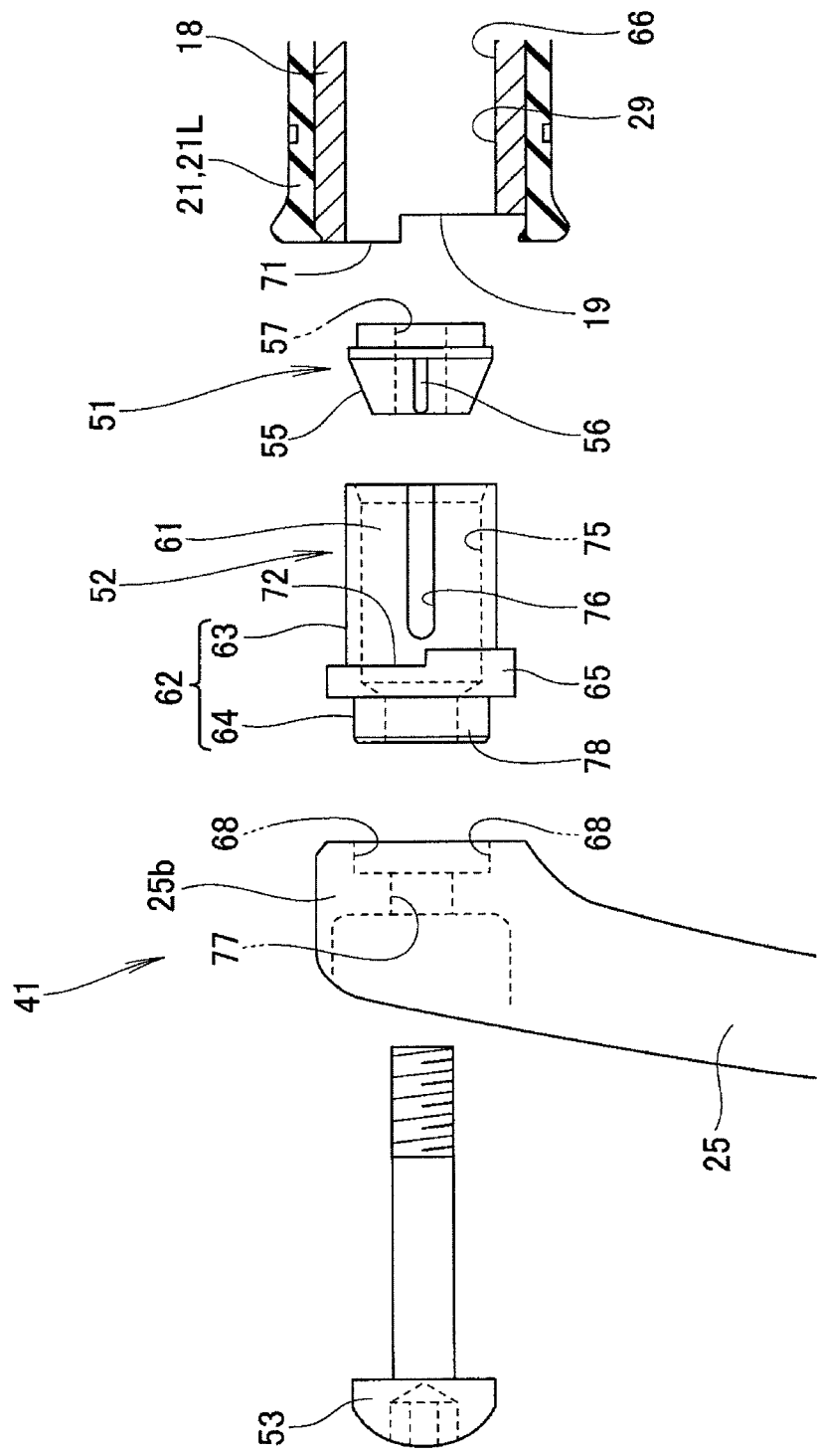
FIG. 4 is an exploded perspective view illustrating a structure of mounting a lever guard to a steering handlebar (first connection)

As illustrated in FIG. 4, the first connection 41 includes a nut 51 formed in a shape of approximate circular truncated cone in a side view, a collar 52 engaged with the nut 51, a rear end portion 25b of the lever guard 25 engaged with the collar 52, and a first fastening member 53 fastened to the rear end portion 25b of the lever guard 25 and the nut 51 inserted into the collar 52.

The nut 51 has a bevel 55 of an approximate truncated-cone shape, a pawl 56 projecting from the bevel 55 and a female screw 57.

In turn, the collar 52 is a cup-shaped member, including a cup portion 61 and a flange 65 provided on an outer peripheral surface 62 of the cup portion 61. The outer peripheral surface 62 of the cup portion 61 includes two parts located on opposite sides of the flange 65, a first outer peripheral face 63 forming one of the parts and abutting on a hole 29 of the steering handlebar 18 after the collar 52 is inserted into the hole 29 (inner wall 66) of the steering handlebar 18, and a second outer peripheral face 64 forming the other part and abutting on a lever recess 68 of the lever guard 25 after the collar 52 is inserted into the lever recess 68.

The flange 65 has a recess 72 formed thereon. The recess 72 is formed so that the flange 65 is engaged with a protrusion 71 of the lateral end 19 after the collar 52 is inserted into the lateral end 19 of the steering handlebar 18. In the cup portion 61, a nut engaging hole 75 is formed which is engaged with the bevel 55 of the nut, a slit 76 which is formed in the outer peripheral surface 62 of the cup portion 61 in a position corresponding to the nut engaging hole 75 and is engaged with the pawl 56 of the nut 51 and the second outer peripheral face 64 which is formed on the opposite side of the flange 65 from the slit 76 and is engaged with the lever recess 68 formed in the lever guard 25. The collar 52 has a collar protrusion 78 engaged with the lever recess 68 of the lever guard 25. The rear end portion 25b of the lever guard 25 has a hole 77 through which the first fastening member 53 is inserted, and the lever recess 68 communicating with the hole 77 and engaged with the collar protrusion 78 formed on the collar 52.

For assembling, the nut engaging hole 75 of the collar 52 is engaged with the bevel 55 of the nut 51. The lever recess 68 of the lever guard 25 is engaged with the collar protrusion 78 of the collar 52. The first fastening member 53 is inserted through the hole 77 of the lever guard 25 to be temporarily secured to the nut 51. After the nut 51, the collar 52, the lever guard 25 and the first fastening member 53 have been assembled together, the first outer peripheral face 63 of the collar 52 is inserted into the hole 29 of the pipe-shaped steering handlebar 18. At this stage, the recess 72 of the collar 52 is engaged with the protrusion 71 of the steering handlebar 18 in order to inhibit the rotational movement of the lever guard 25 relative to the steering handlebar 18.

Then, the first fastening member 53 is retightened. By retightening, the bevel 55 of the nut 51 is moved into the nut engaging hole 75 in the engaging direction to expand the first outer peripheral face 63, so that the first outer peripheral face 63 is held by the inner wall 66 of the steering handlebar 18. At this time, the pawl 56 is engaged with the slit 76 to stop rotation of the nut 51, enabling smooth retightening.

In the embodiment, a protrusion is provided at the lateral end of the steering handlebar, while a recess is provided in the collar. However, a recess may be provided in the lateral end of the steering handlebar and a protrusion may be provided on the collar without any problem.

Figure 5:
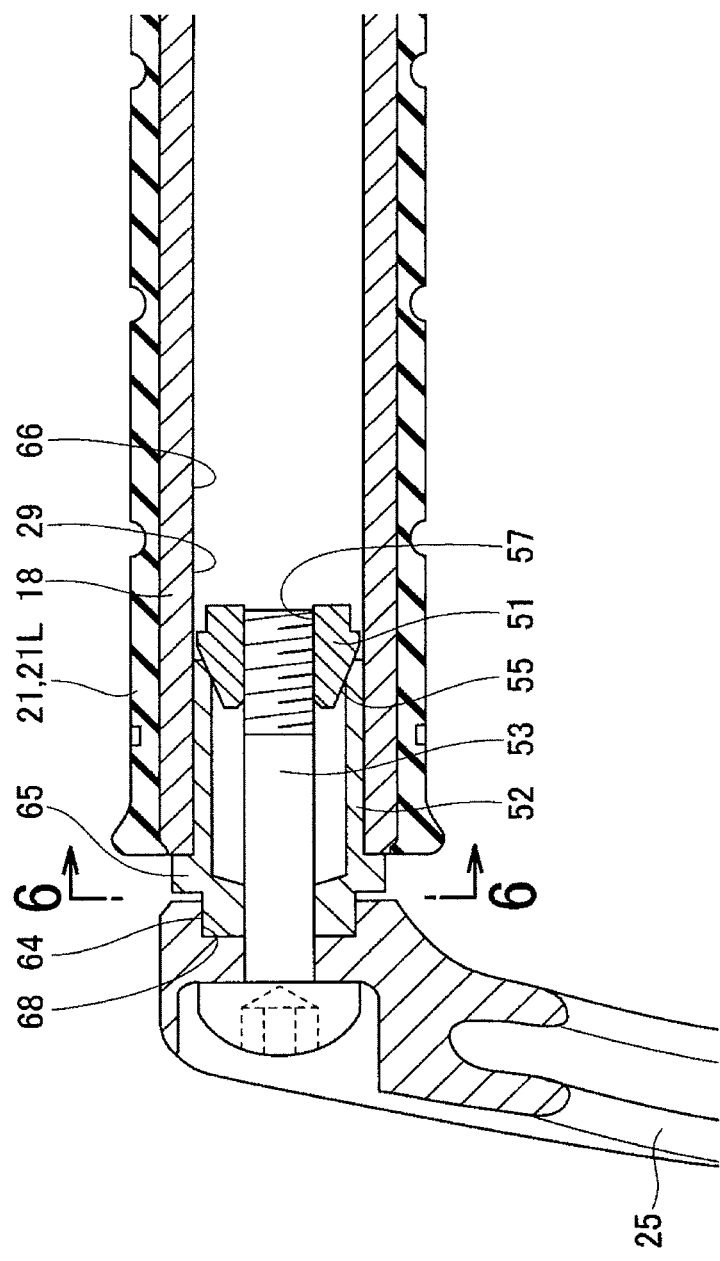
FIG. 5 is a sectional view illustrating the structure in FIG. 3 after the first connection has been mounted.

As illustrated in FIG. 5, the first fastening member 53 described in FIG. 4 is attached to the lateral end 19 of the steering handlebar 18 by being rotated for retightening.

To make the above short, the first connection 41 includes the collar 52 having the slit 76 (see FIG. 3) inserted within the steering handlebar 18, and the nut 51 having the taper-shaped bevel 55 engaged with the collar 52. When the first fastening member 53 is tightened with the nut 51, the slit 76 formed in the collar 52 is opened up outward by a tractive force produced by the first fastening member 53, so as to be pressed against the hole 29 (inner wall 66) of the steering handlebar 18, so that the first connection 41 is retained in the steering handlebar 18 in place.

Next, the structure of engaging the rear end portion 25b of the lever guard 25 with the collar 52 will be described.

Figure 6:
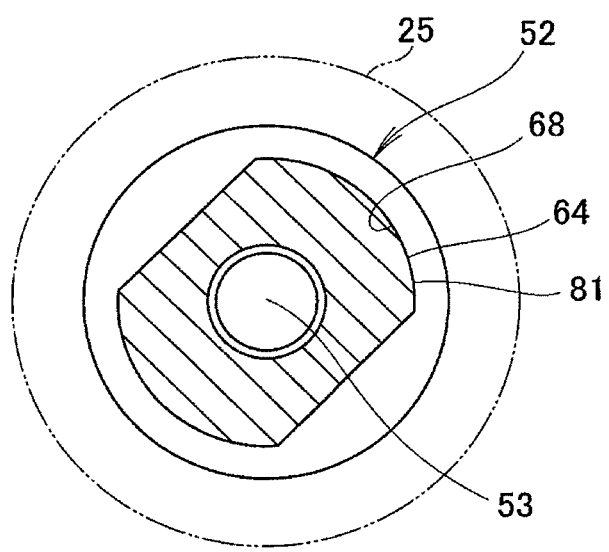
FIG. 6 is a sectional view taken along line 6-6 in FIG. 5.

As illustrated in FIG. 6, the second outer peripheral face 64 corresponding to the collar protrusion 78 formed on the collar 52 has an oval-shaped portion 81. In accordance with the oval-shaped portion 81, the lever recess 68 is formed in the rear end portion 25b of the lever guard 25. The oval-shaped fitting structure supports the lever guard 25 in such a manner so as to be incapable of rotating relative to the collar 52.

Next, a second connection and a third connection will be described with reference to FIG. 7 and FIG. 8.

Figure 7:
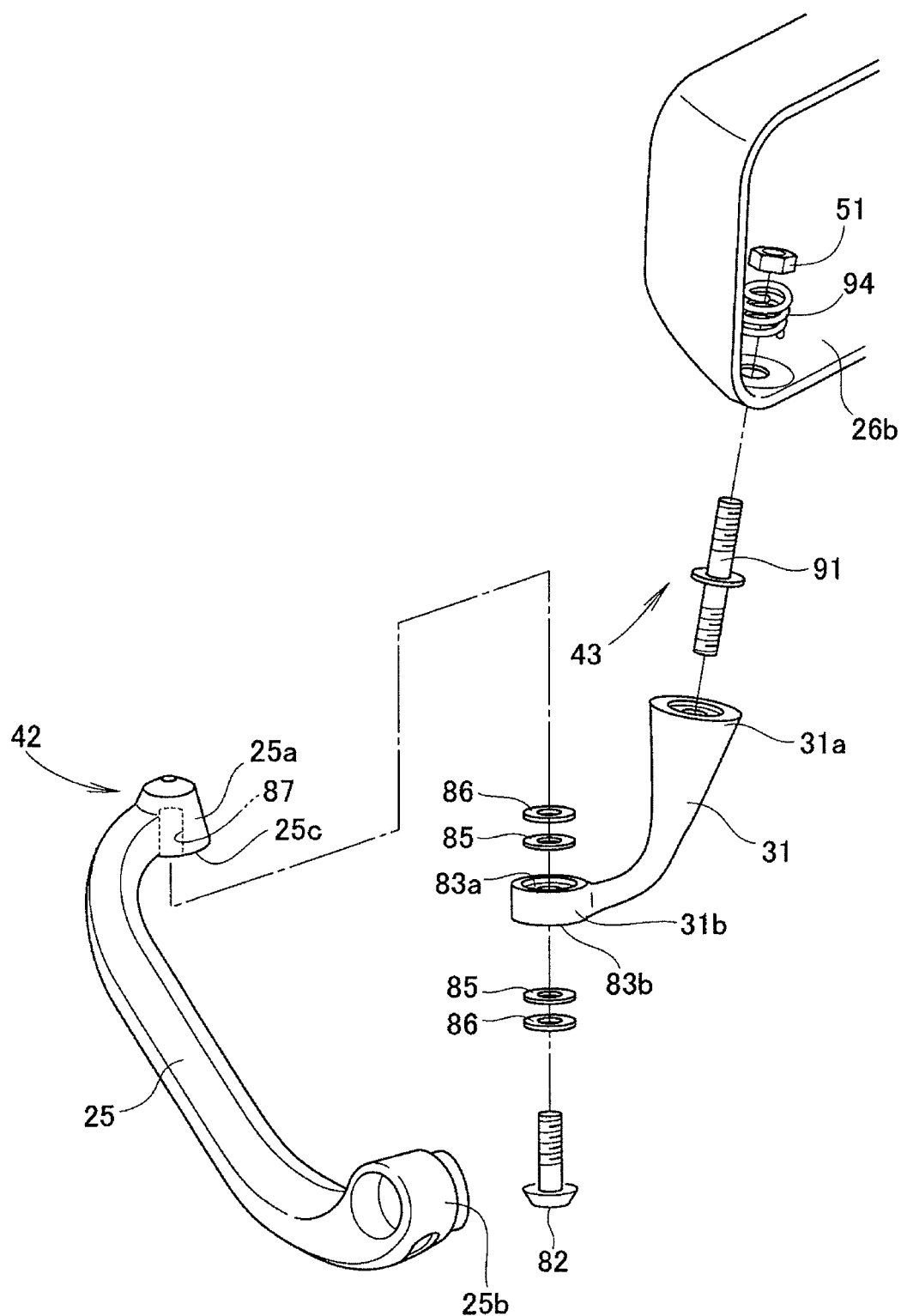
FIG. 7 is an exploded perspective view illustrating portions around a mirror stay and around a mirror body.

As illustrated in FIG. 7, the lower end 31b of the mirror stay 31 abuts the front end portion 25a of the lever guard 25 from below in the upward direction, which are fastened with a second fastening member 82 inserted upwardly from below. Such a second fastening member 82 forms part of the second connection 42 that connects between the front end portion 25a of the lever guard 25 and the lower end 31b of the mirror stay 31.

In the second connection 42, a first washer 85 and a second washer 86 are placed in this order on a topside 83a of the seat of the mirror stay 31. An underside 25c of the lever guard 25 abuts on the second washer 86. A first washer 85 and a second washer 86 are placed in this order on an underside 83b of the seat of the mirror stay 31. A second fastening member 82 is inserted from below in the upward direction into a female screw 87 threaded in the underside 25c of the lever guard 25, and is fastened to it.

Next, the third connection 43 will be described.

A male threaded rod 91 extending upwardly is screwed into the upper end 31a of the mirror stay 31. The lower end 26b of the mirror body 26 is placed on the upper end 31a of the mirror stay 31. Then, a nut 51 is fastened to the male threaded rod 91. Such a male threaded rod 91 and a nut 51 form part of the third connection 43 that connects between the upper end 31a of the minor stay 31 and the lower end 26b of the mirror body 26.

Next, the second fastening member will be described in detail.

Figure 8:
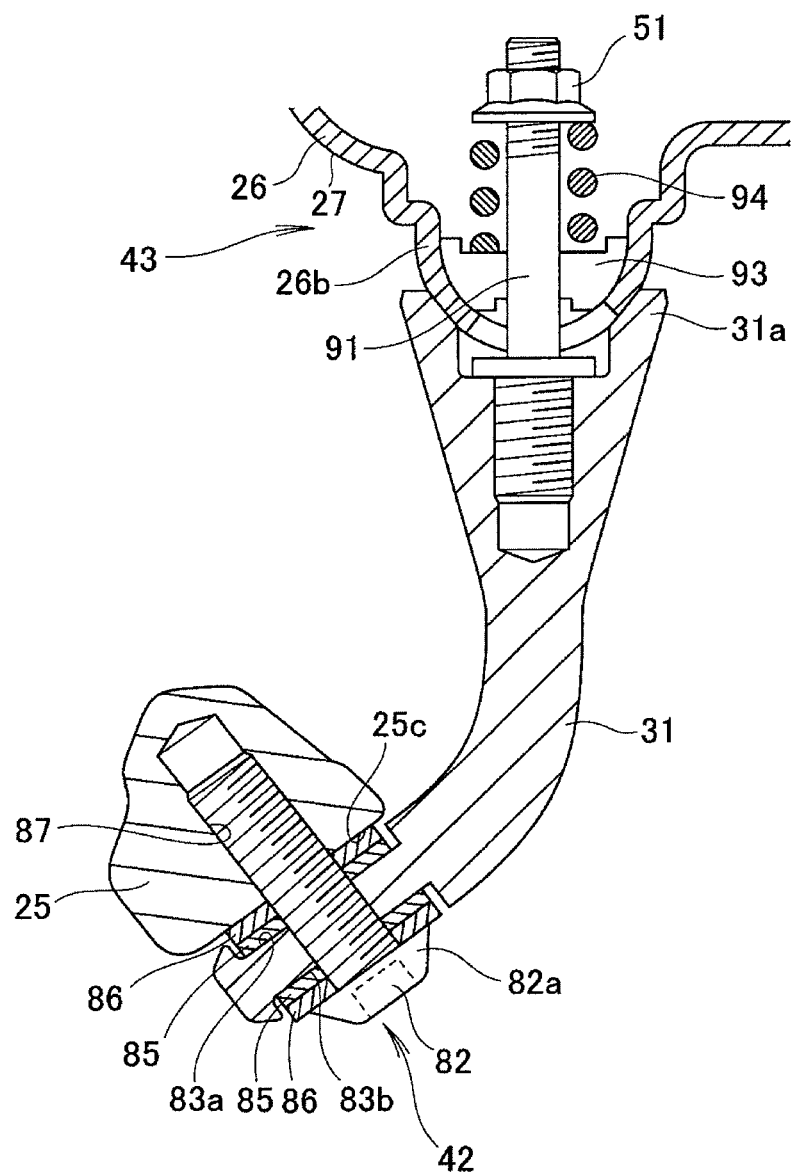
FIG. 8 is a sectional view of a second connection and a third connection.

As illustrated in FIG. 8, the first washer 85 and the second washer 86 are interposed in this order between the topside 83a of the seat of the mirror stay 31 and the lever guard 25. Also, the first washer 85 and the second washer 86 are interposed between the underside 83b of the seat of the mirror stay 31 and the head 82a of the second fastening member 82.

The surface of the first washer 85 is coated with PTFE (polytetrafluoroethylene). The PTFE coating makes it possible to reduce the coefficient of friction as compared with metal without PTFE coating. The second washer 86 is laid on the first washer 85 with such PTFE coating, and the second fastening member 82 forms a sliding portion of the second connection 42. As a result, appropriate friction can be applied to the second connection 42, making it possible to rotate the mirror stay 31 relative to the lever guard 25 by moderate force.

The mirror body 26 includes the minor holder 27, a hole-perforated retainer 93 which is placed in the bottom of the mirror holder 27 and through which the male threaded rod 91 is inserted, and the mirror 28 (see FIG. 2) held as a reflecting plate by the mirror holder 27.

The hole-perforated retainer 93 of the mirror holder 27 is fitted over the male threaded rod 91 erected on the mirror stay 31. Then, a coil spring 94 is fitted over the male threaded rod 91. Finally, the nut 51 is fastened to attach the minor body 26 to the mirror stay 31. Such structure enables adjustment of the minor body 26 relative to the mirror stay 31 in the forward, rearward, leftward and rightward directions.

Figure 9:
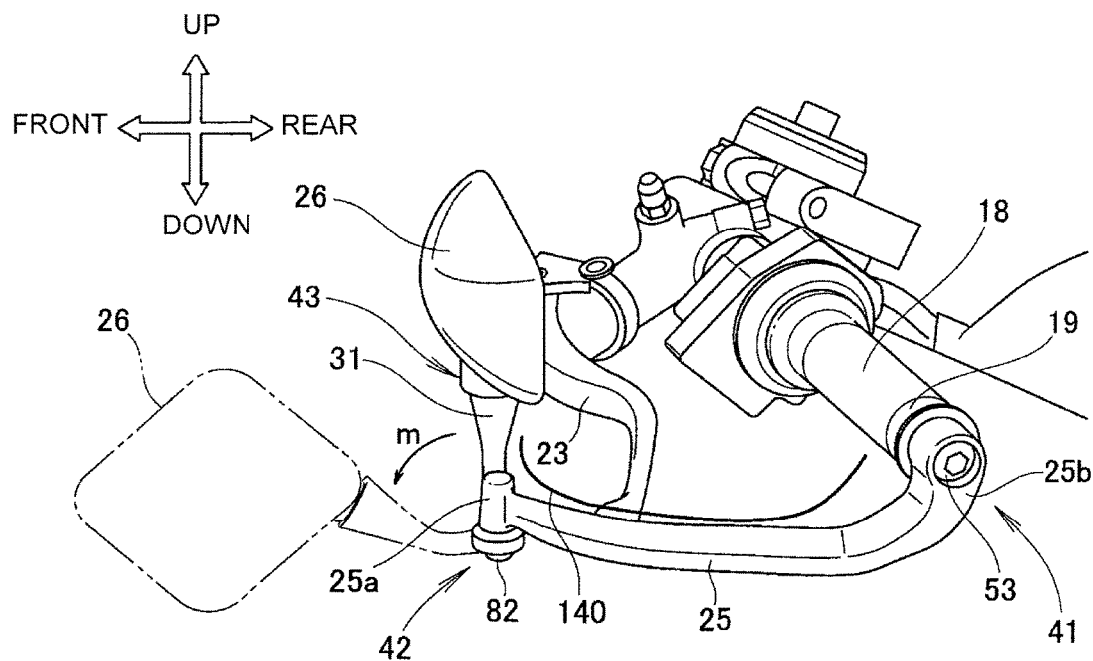
FIG. 9 is a side view of a lever guard and an action explanatory view (showing the mirror body rotated outward in the vehicle-width direction)

As illustrated in FIG. 9, the first connection 41 connecting between the steering handlebar 18 and the lever guard 25 is fastened to the lateral end 19 of the steering handlebar 18 with the first fastening member 53 for insertion of the rear end portion 25b of the lever guard 25 from the outside toward inside in the vehicle width direction. When the vehicle is viewed from the side, the lever guard 25 and the mirror stay 31 have a downward protruding arc shape.

Next, the operation of the front structure of the saddle-ride type vehicle described above will be described.

Additionally referring to FIG. 2 and FIG. 3, the second connection 42 connecting between the lever guard 25 and the mirror stay 31 is placed forward of the front end 24a of the brake lever 24 or the front end 23a of the clutch levee 23.

The lever guard 25 is provided at the lateral end 19 of the steering handlebar 18. The lower end 31b of the mirror stay 31 vertically extending is attached to the forward portion of the lever guard 25. In addition, the mirror body 26 is attached to the upper end 31a of the mirror stay 31. In short, the lever guard 25 is mounted to the steering handlebar 18, and the mirror body 26 is mounted to the lever guard 25 through the mirror stay 31.

With such structure, the lever guard 25 and the mirror 28 can be readily mounted to the steering handlebar 18. In addition, even in a vehicle equipped with the lever guard 25, the mirror body 26 can be placed in an optimum position.

Figure 10:
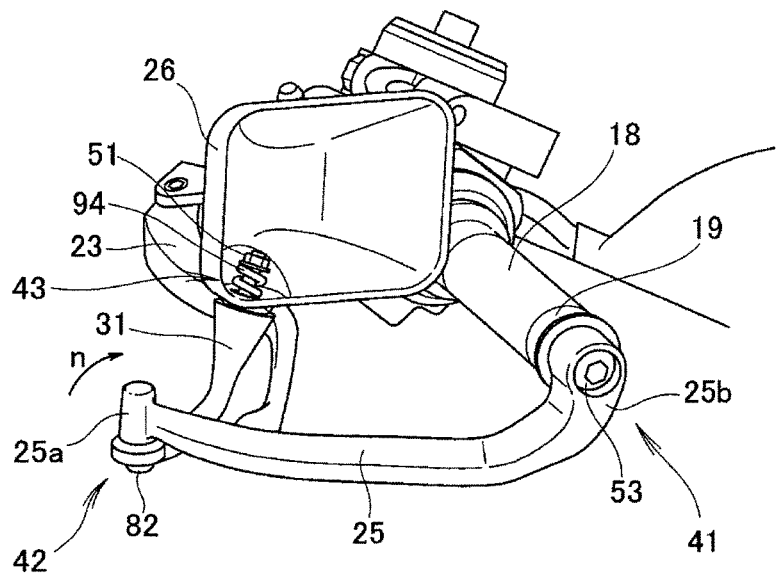
FIG. 10 is an action explanatory view of the lever guard (showing the mirror body rotated inward in the vehicle-width direction)

Further, referring to FIG. 9 and FIG. 10, the steering handlebar 18 and the lever guard 25 are fastened in the first connection 41. The lever guard 25 and the mirror stay 31 are fastened in the second connection 42. In addition, the mirror stay 31 and the mirror body 26 are fastened in the third connection 43. In this manner, the lateral end 19 of the steering handlebar 18, the lever guard 25, the mirror stay 31 and the mirror body 26 are fastened together in the first connection 41, the second connection 42 and the third connection 43.

More specifically, in FIG. 8, the mirror body 26 can rotate about the second fastening member 82 to move to a position in the direction of arrow m. In FIG. 9, the mirror body 26 can rotate about the second fastening member 82 to move to a position in the direction of arrow n. In this manner, the orientation of the mirror body 26 is rotatable about the second fastening member 82. In addition, the orientation of the mirror body 26 can also be adjusted by use of the third connection 43. As a result, the degree of freedom of positional adjustment to the mirror body 26 is increased to facilitate orienting the mirror body 26 in an arbitrary direction.

Also, the lever guard 25 is fastened with the first fastening member 53 inserted inward from outside in the vehicle-width direction. The workability associated with the mounting can be improved in view of the fact that the fastening is provided by inserting the first fastening member 53 from the outside to the inside.

Returning to FIG. 4, the first connection 41 has the collar 52 and the nut 51 which includes the bevel 55 formed in a tapered shape and engaged with the nut engaging hole 75 of the collar 52. The first connection 41 is mounted to the steering handlebar with the simple structure including the nut 51 of a tapered shape, the collar 52 with the slit 76 and the first fastening member 53. In addition, the first fastening member 53 is rotated for adjustment in the axis direction of the first fastening member 53, facilitating positioning of the first connection 41.

Further, one and the other of the lateral end 19 of the steering handlebar 18 and the collar 52 are provided with the recess 72 and the protrusion 71 for detent. The engagement of the recess 72 and the protrusion 71 with each other achieves the prevention of rotation of the lever guard 25 with the unsophisticated structure. In addition, the simple recess 72 and protrusion 71 facilitates addressing dimensional errors occurring in manufacturing.

Returning to FIG. 7, the second connection 42 is fastened by the second fastening member 82 inserted upwardly from below. Because the second fastening member 82 is inserted from below in the upward direction, it is unlikely that the external appearance would be impaired when viewed from above.

The second connection 42 is fastened by the second fastening member 82 with the two washers 85, 86 that are placed on each of the upward and downward sides of the mirror stay 31. The interposition of the washers 85, 86, two of which are placed on each side, causes application of an appropriate friction when the mirror stay 31 is rotated. As a result, the rotating movement of the mirror stay 31 can be smoothly and readily adjusted.

In the third connection 43, the nut 51 is fastened after being inserted from above in the downward direction. In this case, the nut 51 is hidden behind the mirror 28 (see FIG. 2) mounted to the mirror body 26. Because of this, there is no concern about loss of external appearance.

Additionally referring to FIG. 3 and FIG. 9, the lever guard 25 and the mirror stay 31 are designed to have a downward protruding arc shape 140. Because of the lever guard 25 and the mirror stay 31 of the downward protruding arc shape 140, the lever guard 25 bypasses the lever, making it difficult for the occupant's hand to touch the lever guard 25.

Next, a second embodiment according to the present invention will be described with reference to the drawings.

Figure 11:
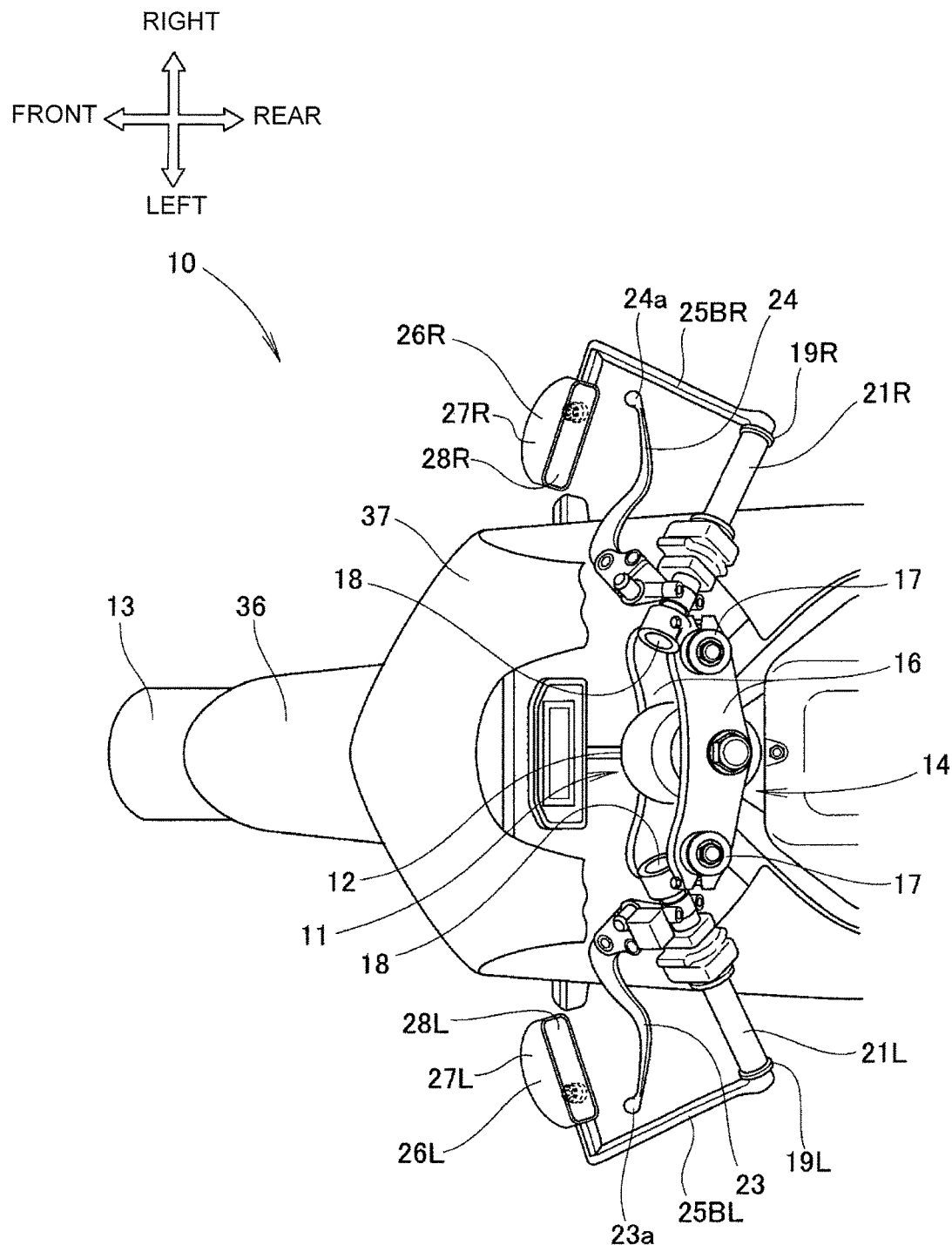
FIG. 11 is a plan view of a motorcycle according to second embodiment.

As illustrated in FIG. 11, a left lever guard 25BL extends forward to protect the clutch lever 23 is mounted at the left lateral end 19L of the steering handlebar 18, while a right lever guard 25BR extending forward to protect the brake lever 24 is mounted at the right lateral end 19R of the steering handlebar 18.

The left and right mirror bodies 26L, 26R are attached respectively to front ends of the left and right lever guards 25BL, 25BR. The left and right mirror bodies 26L, 26R respectively include the mirror holders 27L, 27R and the mirrors 28L, 28R fitted in the mirror holders 27L, 27R.

The following description in FIG. 12 to FIG. 16 is of the right lever guard 25BR and the right mirror body 26R mounted to the right of the steering handlebar. However, the explanation of the structure of the left lever guard and the left mirror body mounted to the left of the steering handlebar is omitted because of the structure with bilateral symmetry about the center line in the vehicle-width direction. Also, suffixes (L, R) designating left and right are omitted.

Figure 12:
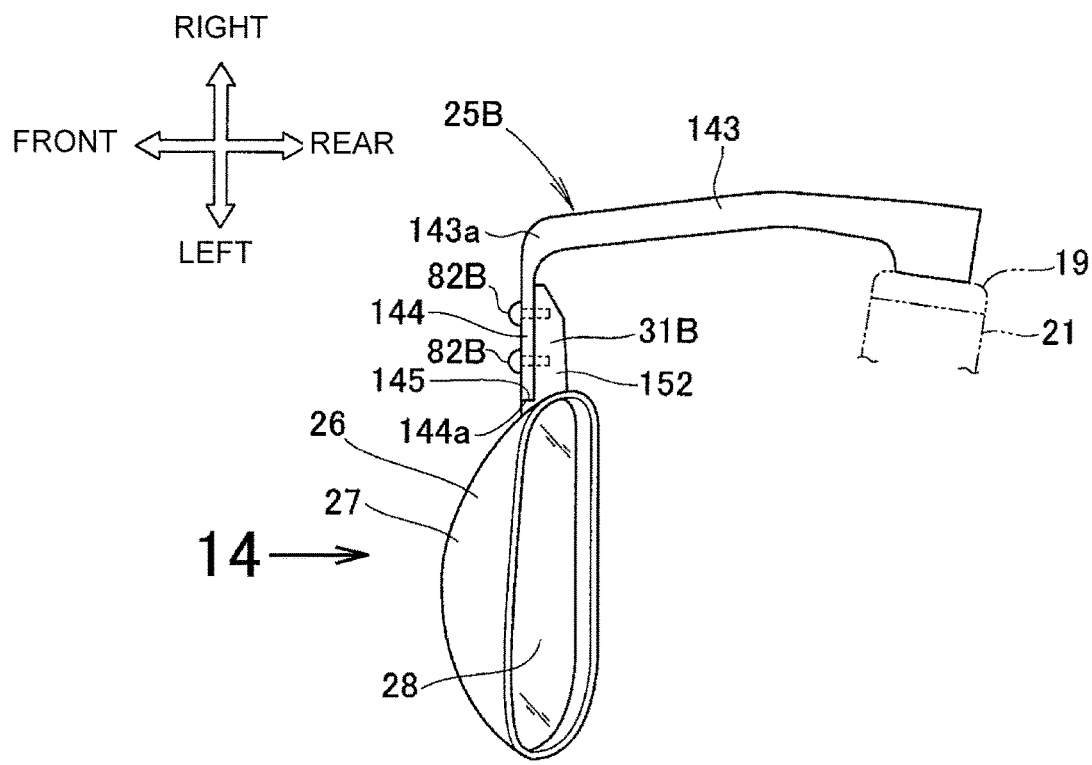
FIG. 12 is an enlarged view of an essential part of FIG. 11.

As illustrated in FIG. 12, the lever guard 25B includes a front arm 143 extending forward from the steering handlebar 18 (see FIG. 11), and an inner arm 144 extending inward in the vehicle-width direction from a front end 143a of the front arm 143. A leading end 144a of the inner arm 144 of the lever guard 25 abuts on shoulder 145 formed on the mirror stay 31B.

Figure 13:
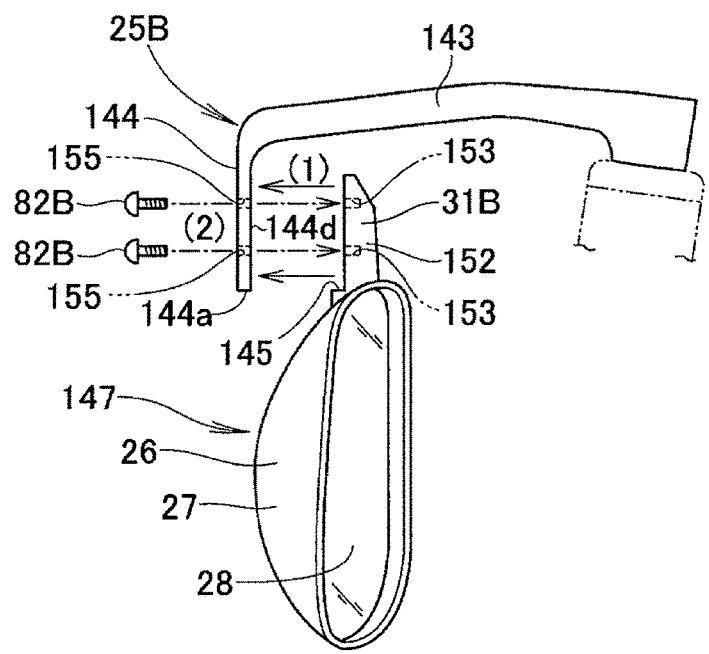
FIG. 13 is an exploded view of FIG. 12.

As illustrated in FIG. 13, when a mirror assembly 147 including the mirror stay 31B and the mirror body 26 that are connected together is mounted to the lever guard 25B, a horizontal arm 152 of the mirror stay 31B included in the mirror assembly 147 is moved from the rear to the front to come into contact with a rear face 144d of the inner arm 144 such that the shoulder 145 formed on the mirror stay 31 abuts on the leading end 144a of the inner arm 144. Then, second fastening members 82B are inserted from front to rear through holes 155 formed in the inner arm 144, and male screws (second fastening members 82B) are fastened to female screws 153 formed in the horizontal arm 152, so that the mirror assembly 147 is mounted to the lever guard 25B. Because the shoulder 145 is provided on the mirror stay 31B, positioning of the mirror assembly 147 including the mirror stay 31B is facilitated, improving the workability associated with mounting.

Figure 14:
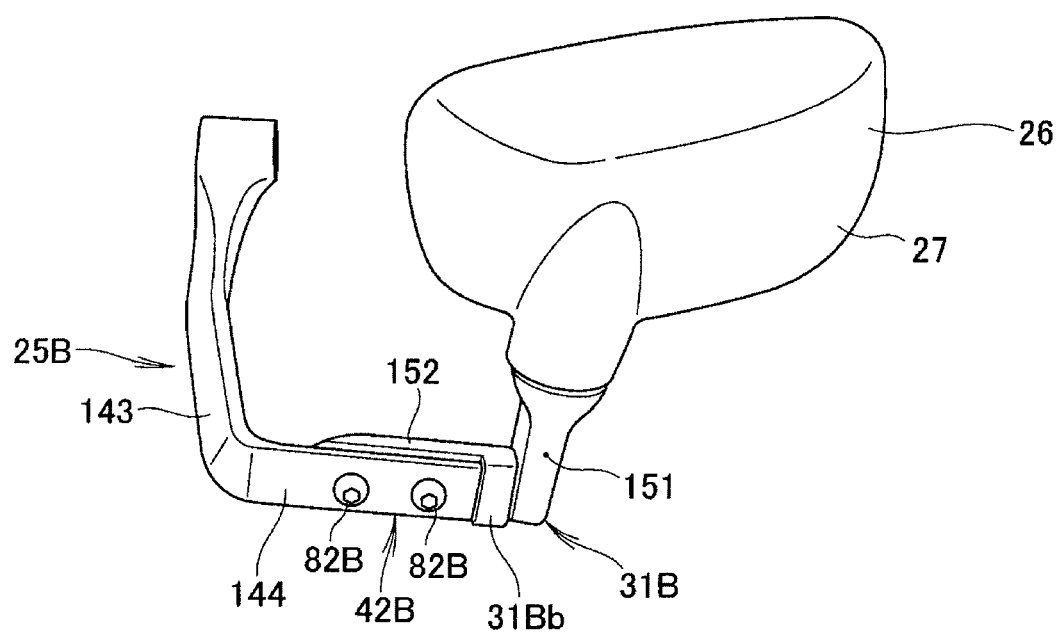
FIG. 14 is a view taken along arrowed line 14 in FIG. 12.

As illustrated in FIG. 14, a second connection 42B to fasten the mirror stay 31B to the lever guard 25B is fastened by the second fastening members 82B inserted rearward from the front in the forward and rearward direction after a lower end 31Bb of the mirror stay 31B has been placed to the inner arm 144 forming a front end portion of the lever guard 25B. The two second fastening members 82B are arranged side by side in the vehicle-width direction. This increases the fastening stiffness as compared with the case of use of a single second fastening member 82B.

Next, the structure of the mirror stay 31B and the like will be described.

Figure 15:
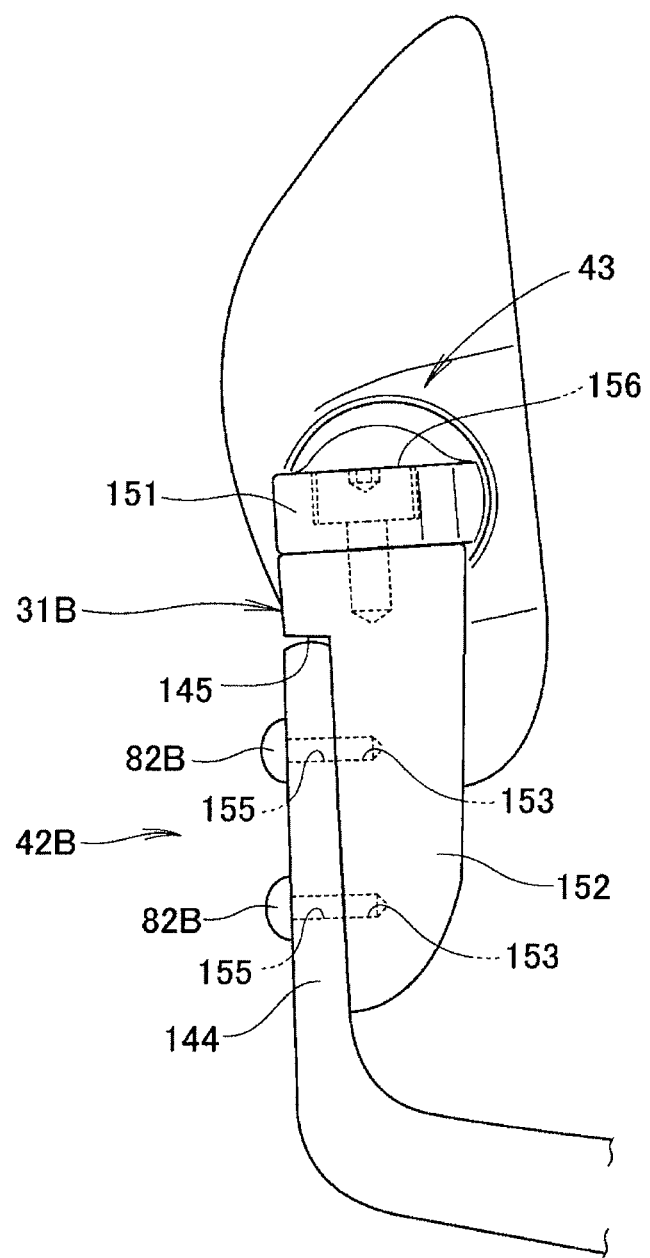
FIG. 15 is an underside view of a second connection and its surroundings according to the second embodiment.

As illustrated in FIG. 15, the mirror stay 31B includes, as main elements, the horizontal arm 152 having the shoulder 145, a vertical arm 151 extending approximately at right angles to the horizontal arm 152 from the horizontal arm 152, and a forward and rearward turning screw 156 connecting between the horizontal arm 152 and the vertical arm 151, and rotatably connecting the vertical arm 151 relative to the horizontal arm 152.

The structure of the third connection 43 provided at the upper end of the vertical arm 151 to be connected to the mirror body 26 is not much different than the first embodiment, and therefore its description is omitted.

Figure 16:
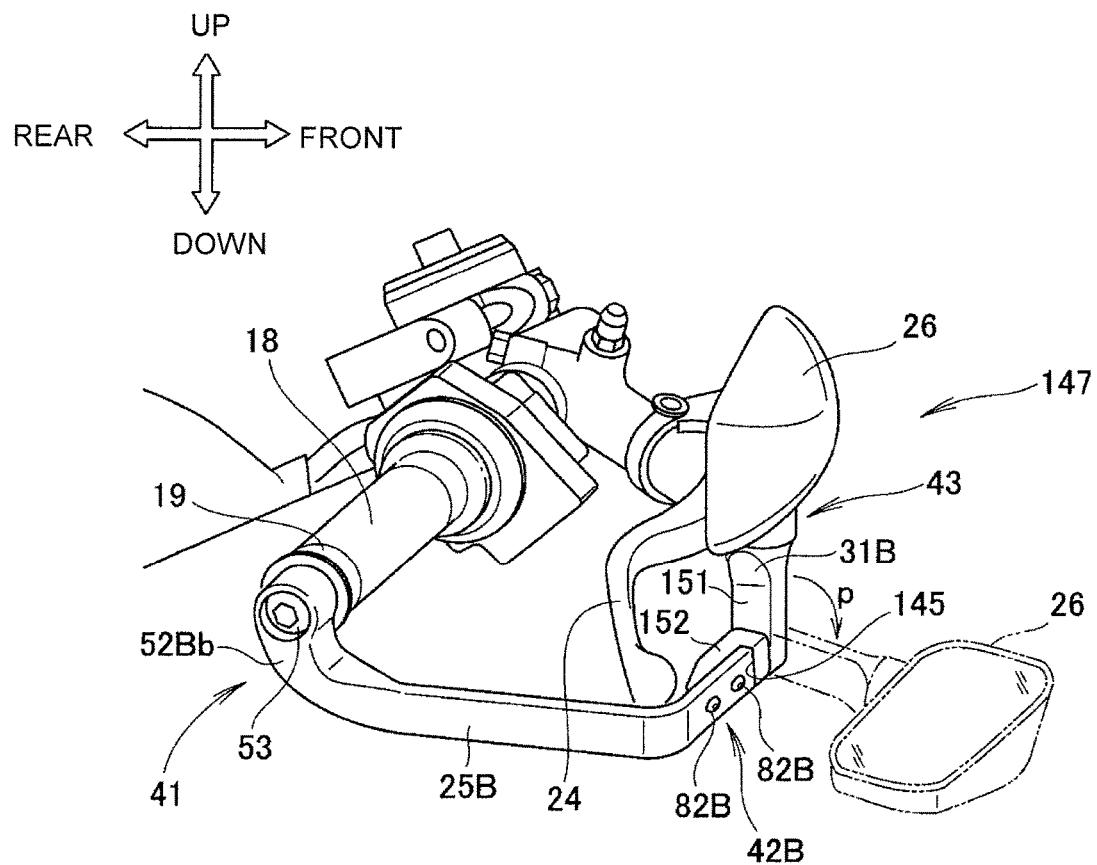
FIG. 16 is a side view of a lever guard and an action explanatory view (showing the mirror body rotated in the forward direction of the vehicle)

As illustrated in FIG. 16, the mirror assembly 147 including the mirror stay 31B is shown in the state of rotating, relative to the lever guard 25B, forward in the direction of arrow p in FIG. 16 on the forward and rearward turning screw 156 (see FIG. 15). In the second embodiment, because the forward and rearward turning screw 156 connecting the horizontal arm 152 of the mirror stay 31B and the vertical arm 151 of the mirror stay 31B to each other is provided, the degree of freedom of positional adjustment to the mirror body 26 is increased.

The second connection 42B is fastened by the second fastening members 82B inserted rearwardly from the front in the forward and rearward direction. Because the second fastening member 82B is inserted rearward from the front, when the second connection 42B is viewed from above or from the obliquely upward direction, the external appearances of the lever guard 25B and the mirror body 26 are not easily impaired. As a result, the external appearances around the lever guard 25B and the mirror body 26 are improved.

Next, a modification of the second embodiment will be described.

Figure 17:
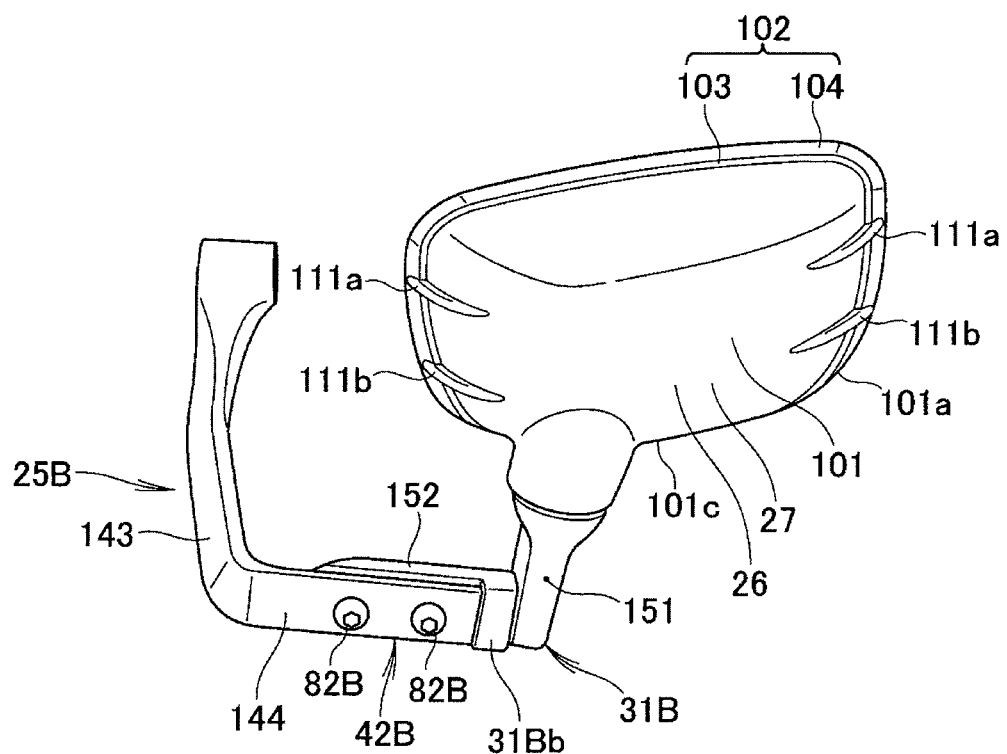
FIG. 17 is a modified diagram of FIG. 14.
Figure 18:
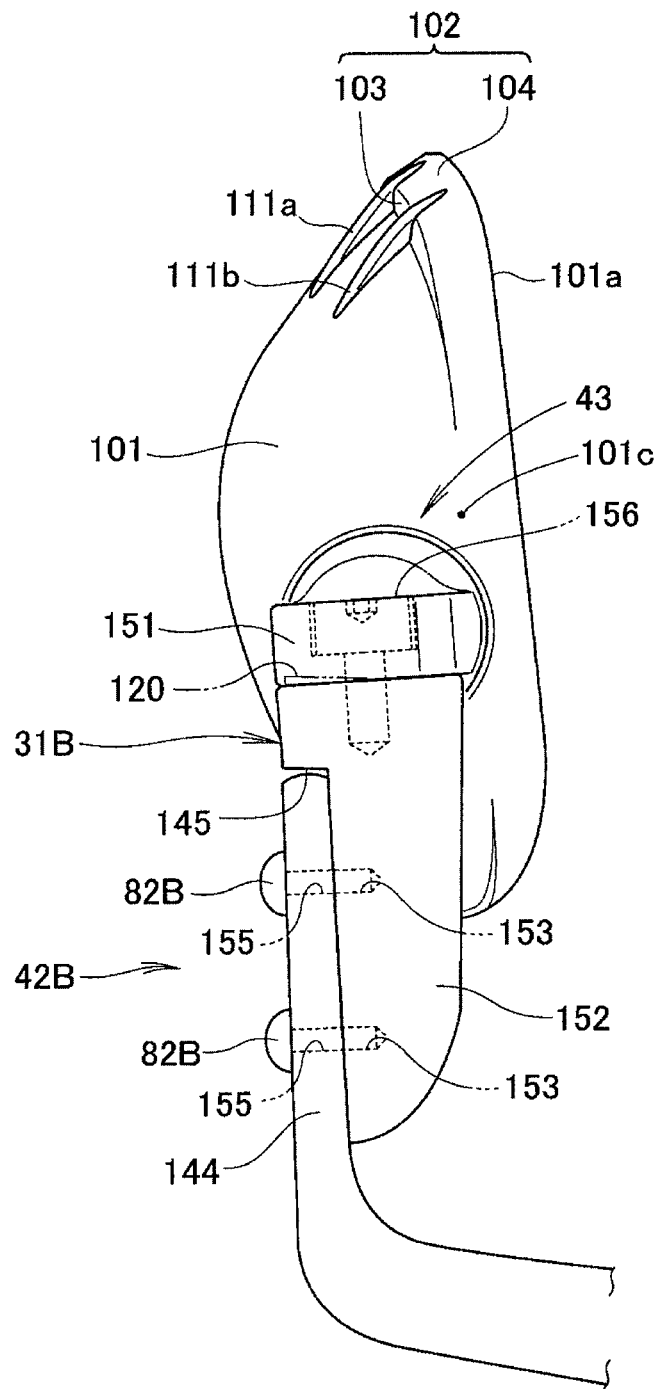
FIG. 18 is a modified diagram of FIG. 15.
Figure 19:
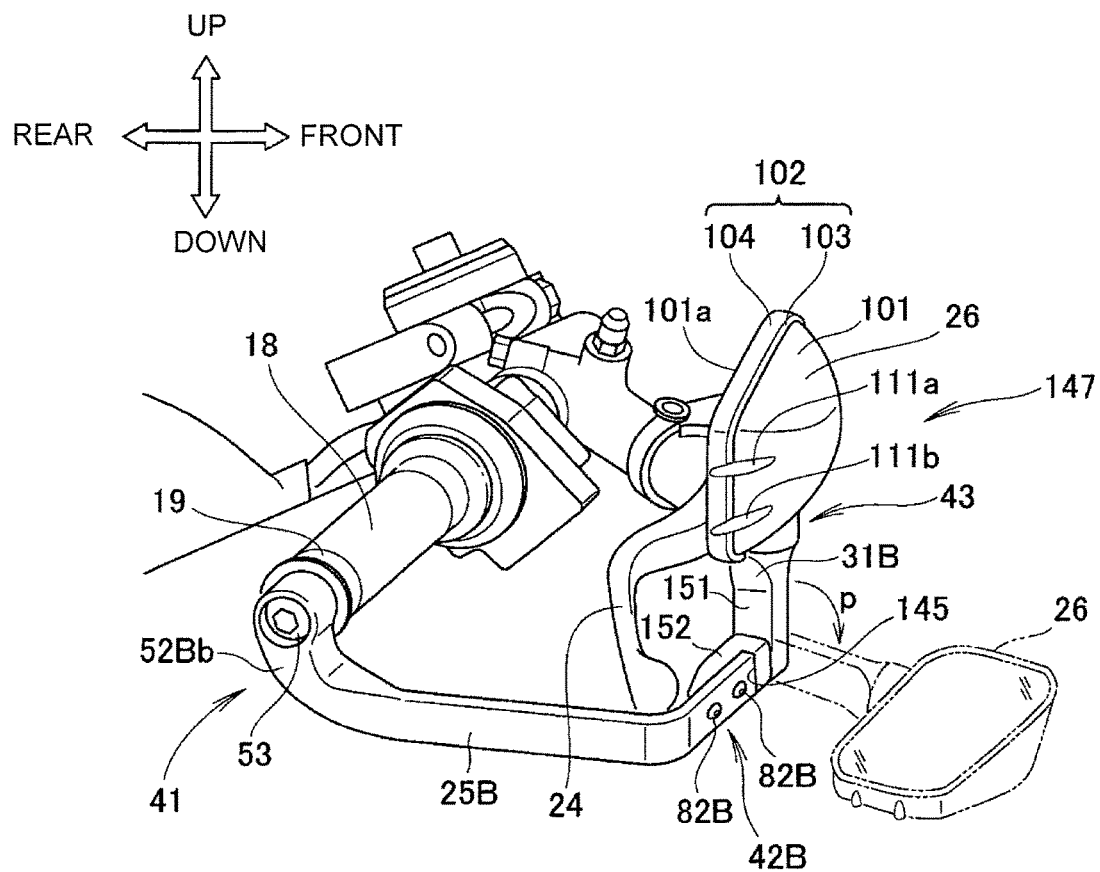
FIG. 19 is a modified diagram of FIG. 16.

As illustrated in FIGS. 17 to 19, the lever guard 25B protecting the brake lever 24 (see FIG. 6) includes the front arm 143 extending forward from the steering handlebar 18 (see FIG. 11), and the inner arm 144 extending inward in the vehicle-width direction from the front end of the front arm 143. The mirror stay 31B is fastened to the inner arm 144 by two second fastening members 82B. The mirror stay 31B supporting the mirror body 26 includes, as main elements, the horizontal arm 152, the vertical arm 151 extending upward approximately at right angles from the horizontal arm 152, and the forward and rearward turning screw 156 rotatably connecting the vertical arm 151 relative to the horizontal arm 152.

The mirror body 26 includes the mirror 28 (see FIG. 13) and the mirror holder 27 in which the mirror 28 is mounted. The mirror holder 27 has a cover face 101 facing toward the front of the vehicle so that a flow of air from the front blows directly against the cover face 101, and the mirror 28 for confirming rear view of the motorcycle is mounted on the other side of the cover face 101.

The modification of the second embodiment will be hereinafter described about its features which are different from the structure of the second embodiment. In the cover face 101, a step portion 102 is formed along an outer peripheral portion 101a on the inner side of the outer peripheral portion 101a of the cover face 101. The step portion 102 has an outward face 103 extending in the outward direction of the mirror holder 27, and an inclined face 104 extending from a rear end of the outward face 103 toward the rear of the vehicle. In FIG. 18, the closer to a bottom 101c of the cover face 101 at which the mirror stay 31B is connected, the shallower the step portion 102 becomes, and then the step portion 102 disappears in proximity to the bottom 101c.

In addition to the step portion 102, fins 111a, 111b are formed in a rib shape on the left and right end portions of the cover face 101 to rectify a flow of air flowing rearwardly from the front of the vehicle. The two fins 111a and the two fins 111b are placed respectively at the upper side and the lower side. The rear ends of the fins 111a, 111b are connected to the step portion 102.

In addition to providing the step portion 102 and the fins 111a, 111b on the cover face 101, the mirror body 26 is placed forward of the arm of the occupant when viewing the vehicle from the front. As a result, the arm of the occupant will be able to be protected from a flow of air.

Referring further to FIG. 18, a turning restricting portion 120 is provided on the horizontal arm 152 of the mirror stay 31B to restrict rotating movement of the vertical arm 151 of the mirror stay 31B with respect to the horizontal arm 152. As a result, when the mirror body 26 rotates about the forward and rearward turning screw 156 relative to the lever guard 25B in the direction opposite to the direction of arrow p in FIG. 19, the rotation is restricted at a predetermined angle, thus preventing the mirror body 26 or the mirror stay 31B from coming into contact with the brake lever 24.

The present invention is applied to the motorcycle in the embodiments, but is applicable to saddle-ride type three-wheeled vehicles, and may be applied to general saddle-ride type vehicles without any problem.

The present invention is suitable for motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front structure of a saddle-ride vehicle, comprising:
a grip provided at a distal end of a steering handlebar;
a lever provided forward of the steering handlebar, a distal end of the lever being spaced from the grip in a forward direction by a first distance;
a lever guard operatively mounted at the distal end of the steering handlebar having a front arm extending in the forward direction from the steering handlebar, the front arm having a length in the first direction greater than the first distance and an inner arm extending horizontally inwardly from a distal end of the front arm passed the distal end of the lever so that the lever is between the grip and inner arm, the inner arm having a length less than the length of the front arm;
a mirror stay having an upper end and a lower end attached to a distal end of the inner arm, the mirror stay extending vertically from the inner arm; and
a mirror body attached to the upper end of the mirror stay, the mirror body having a mirror, the mirror facing rearwardly,
wherein the grip, front arm and inner arm form a U-shaped assembly.

2. The front structure of the saddle-ride vehicle according to claim 1, wherein:
the distal end of the steering handlebar and the lever guard are fastened in a first connection;
the lever guard and the mirror stay are fastened in a second connection;
the upper end of the mirror stay and the mirror body are rotatably fastened in a third connection; and
as viewed in a side view of the vehicle, the second connection is placed forward of a front end of the lever.

3. The front structure of the saddle-ride vehicle according to claim 2, wherein the first connection is fastened to the distal end of the steering handlebar with a first fastening member for insertion of a rear end portion of the lever guard from outside toward inside in a vehicle-width direction.

4. The front structure of the saddle-ride vehicle according to claim 3, wherein:
the first connection has a collar having a slit and inserted into the steering handlebar, and a nut of a tapered shape engaged with the collar; and
when the first fastening member is tightened to the nut, the slit is opened up by a tractive force produced by the first fastening member to be pressed against an inner wall of the steering handlebar, so that the first connection is positioned in the steering handlebar.

5. The front structure of the saddle-ride vehicle according to claim 4, wherein:

a recess is provided on one of the distal end of the steering handlebar and the collar, while a protrusion is provided on the other of the distal end of the steering handlebar and the collar; and the recess and the protrusion are engaged with each other to block rotation of the lever guard relative to the steering handlebar.

6. The front structure of the saddle-ride vehicle according to claim 2, wherein the second connection is fastened by a second fastening member inserted rearward from the front in a forward and rearward direction, with the lower end of the mirror stay that is placed to a front end portion of the lever guard.

7. The front structure of the saddle-ride vehicle according to claim 2, wherein the third connection is rotatably fastened by a third fastening member with a lower end of the mirror body that is inserted into the upper end of the mirror stay, and also the mirror body is rotatably supported by the mirror stay.

8. The front structure of the saddle-ride vehicle according to claim 2, wherein, as viewed in a side view of the vehicle, the lever guard and the mirror stay have a downward protruded arc shape.

9. The front structure of the saddle-ride vehicle according to claim 1, wherein, as viewed in a side view of the vehicle, the lever guard and the mirror stay have a downward protruded arc shape.

10. A front structure of a saddle-ride vehicle, comprising:
a grip adapted to be mounted on a distal end of a steering handlebar;
a lever adapted to be mounted on the steering handlebar;
a lever guard operatively mounted at the distal end of the steering handlebar having a front arm extending in a forward direction from the steering handle bar and an inner arm extending horizontally inwardly from a distal end of the front arm, the inner arm having a length less than a length of the front arm;
a mirror stay having a lower end and an upper end, the lower end of the mirror stay being attached to a distal end of the inner arm, the mirror stay extending vertically and perpendicular to the inner arm;
a mirror body attached to the upper end of the mirror stay, the mirror body having a bottom edge, the bottom edge being above the inner arm and grip; and
a mirror on the mirror body, the mirror facing rearwardly,
wherein the grip, front arm and inner arm form a U-shaped assembly.

11. The front structure of the saddle-ride vehicle according to claim 10, wherein:
the distal end of the steering handlebar and the lever guard are fastened in a first connection;
the lever guard and the mirror stay are fastened in a second connection;

the upper end of the mirror stay and the mirror body are rotatably fastened in a third connection; and
as viewed in a side view of the vehicle, the second connection is placed forward of either a front end of the lever.

12. The front structure of the saddle-ride vehicle according to claim 11, wherein the first connection is fastened to the distal end of the steering handlebar with a first fastening member for insertion of a rear end portion of the lever guard from outside toward inside in a vehicle-width direction.

13. The front structure of the saddle-ride vehicle according to claim 10, wherein the mirror stay has a horizontal arm overlapping and attached to the inner arm of the lever guard and a vertical arm pivotally attached to the horizontal arm.

14. The front structure of the saddle-ride vehicle according to claim 13, wherein the horizontal arm has a notch forming a section having a reduced thickness in the forward direction and a shoulder, and
wherein the distal end of the inner arm fits within the notch to overlap the horizontal arm and be proximate the shoulder.

15. A front structure of a saddle-ride vehicle, comprising:
a grip provided at a distal end of a steering handlebar;
a lever provided forward of the steering handlebar;
a lever guard operatively mounted at the distal end of the steering handlebar having a front arm extending in a forward direction from the steering handlebar and an inner arm extending inwardly from a distal end of the front arm;
a lower end of a mirror stay attached to a distal end of the inner arm; and
a mirror body attached to an upper end of the mirror stay,
wherein the mirror stay has a horizontal arm overlapping and attached to the inner arm of the lever guard and a vertical arm pivotally attached at a junction to the horizontal arm about a horizontal axis that is parallel to a longitudinal axis of the horizontal arm, the vertical arm being perpendicular to the horizontal arm at the junction,
wherein a fastener extends through the horizontal arm and inner arm in the forward direction, and
wherein the grip, front arm and inner arm form a U-shaped assembly.

16. The front structure of the saddle-ride vehicle according to claim 15, wherein the horizontal arm has a notch forming a section having a reduced thickness in the forward direction and a shoulder, and
wherein the distal end of the inner arm fits within the notch to overlap the horizontal arm and be proximate the shoulder.

* * * * *